United States Patent [19]

Burton et al.

[11] Patent Number: 4,523,192
[45] Date of Patent: Jun. 11, 1985

[54] DATA PROCESSING NETWORK

[75] Inventors: Christopher P. Burton, Alderley Edge; Kenneth C. Johnson, Cheadle, both of United Kingdom

[73] Assignee: International Computers Limited, London, England

[21] Appl. No.: 420,272

[22] Filed: Sep. 20, 1982

[30] Foreign Application Priority Data

Dec. 17, 1981 [GB] United Kingdom ............... 8138099

[51] Int. Cl.³ .......................... H04Q 9/00; H04B 3/50
[52] U.S. Cl. .................................. 340/825.57; 375/36
[58] Field of Search ............... 340/825.57, 825.52; 330/188, 195, 190, 197; 370/25, 29, 108; 375/36, 37, 68; 331/151

[56] References Cited

U.S. PATENT DOCUMENTS

| 3,237,164 | 2/1966 | Evans | 375/36 |
| 3,794,759 | 2/1974 | Nick | 375/36 |
| 4,184,045 | 1/1980 | Philipson et al. | 375/36 |
| 4,199,663 | 4/1980 | Herzog | 370/108 |
| 4,353,130 | 10/1982 | Carasso et al. | 370/108 |
| 4,411,004 | 10/1983 | Graham | 375/36 |

Primary Examiner—Donald J. Yusko
Attorney, Agent, or Firm—Lee, Smith & Zickert

[57] ABSTRACT

A data processing network has a plurality of data processing stations which communicate over a bus. Each station is inductively coupled to the bus. Data is transmitted in a binary coded form in which a zero is represented by a pair of oppositely poled pulses and a one is represented by the absence of any pulse. The transmitter circuit includes an energy saving circuit for recovering energy from the backswing of each pulse. Preferably the bus consists of a twisted pair of wires.

4 Claims, 4 Drawing Figures

DATA PROCESSING NETWORK

BACKGROUND TO THE INVENTION

This invention relates to data processing networks comprising a plurality of data processing stations which can communicate with each other over a common bus.

One such network is described for example in U.S. Pat. No. 4,063,220, in which the common bus is a coaxial cable and in which connections are made to the bus by forming T-junctions in the cable. Another such network is described in U.S. Pat. No. 4,199,663, in which the bus is a twisted pair of wires and connections are made inductively by means of magnetic cores, threaded through the twisted pair. The advantage of this is that it is not necessary to cut the bus or to remove any insulation from the wires in order to make a connection.

A problem with inductive coupling is that it may be difficult to ensure that the cores are connected to the bus in the correct sense. If they are connected in the wrong sense, the transmitted signals will be inverted and this may prevent correct transmission of the data. Another problem is that if the signal on the bus has a net D.C. component, this may lead to an undesirable build-up of voltage.

One object of the present invention is to overcome these problems.

SUMMARY OF THE INVENTION

According to the invention there is provided a data processing network comprising:
(a) a plurality of data processing stations;
(b) a common bus interconnecting the stations; and
(c) means for inductively coupling each station to the bus to allow the stations to communicate with one another over the bus;
(d) wherein each station has transmitter means for transmitting data over the bus in a binary-coded form in which one bit value is represented by a pulse immediately followed by a pulse of opposite polarity, and the other bit value is represented by the absence of any pulse.

It can be seen that since the transmitted signal consists of pairs of pulses of opposite polarity, it does not matter in which sense the core is connected to the bus, since reversal of the sense will merely result in reversal of the order of positive and negative pulses, and this will still be detected as the same bit value. Also, since pulses of opposite polarities always occur in pairs, there is no net D.C. component in the signal.

BRIEF DESCRIPTION OF THE DRAWINGS

One data processing network in accordance with the invention will now be described by way of example with reference to the accompanying drawings of which.

DESCRIPTION OF THE EMBODIMENT OF THE INVENTION

General Description of the System

Figure 1:
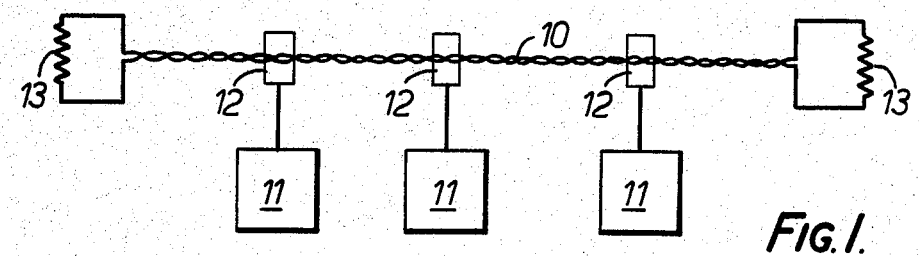
FIG. 1 is a schematic diagram of the network.

Referring to FIG. 1, the data processing network comprises a data communication bus 10 connected to a plurality of data processing stations 11 by means of transceivers 12. The bus 10 consists of a twisted pair (i.e. a pair of insulated wires, uniformly twisted together) and is terminated at each end by a terminating resistor 13. If the twisted pair has a characteristic impedance of 100 ohms, then the terminating resistors 13 are preferably both 100 ohms in value.

The data processing stations 11 may for example be central processing units, data storage units, or data display terminals. Typically, the bus 10 may be up to 1 kilometer in length.

Any of the stations 11 can send a message over the bus to any other station. Each message contains the address of the intended destination and each station compares the addresses of messages appearing on the bus with its own address, so as to decide whether to accept them. Before sending a message, the station first listens to the bus to determine whether it is free or busy. If the bus is free, the station starts to send its message. It is possible, however, that two stations may begin to transmit messages at substantially the same time, and these messages will interfere with each other on the bus. This situation is detected by a collision detection means (not shown) in each station, which compares the outgoing message with the signal actually appearing on the bus. Any discrepancy between these two signals indicates that a collision has occurred. When a collision is detected, the station abandons transmission of the message and makes another attempt later, preferably after a random length of time to reduce the probability of a further collision.

This technique for controlling the utilisation of the bus and dealing with collisions is described in the abovementioned U.S Pat. No. 4,063,220 and so will not be described in detail herein.

In the present system, the transmission rate for sending data over the bus is chosen to be 1 MHz so that each bit occupies a bit-time of 1 microsecond. Timing is by accurate clocks in each station.

DATA TRANSMISSION CODE

Figure 2:
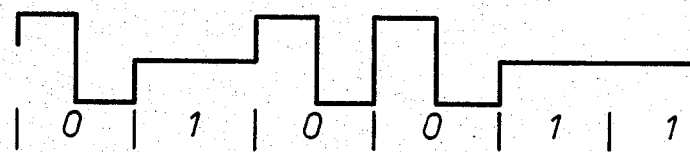
FIG. 2 shows the form of coding used for transmission of data.

Referring to FIG. 2, this shows schematically the form of signals on the bus. As can be seen, a binary "0" is represented by a positive pulse immediately followed by a negative pulse of the same area. A binary "1" is represented by the absence of any signal. (Of course, the opposite convention could have been used, with "1" represented by a positive/negative pulse pair).

This form of code has the advantage that it has no DC component. Moreover, if signals are detected by sensing their positive portions only, the polarity of connection of the transceivers to the bus does not matter since an inverted pulse pair is still detected in the same manner (although detection is delayed by one half bit-time). This is a useful feature since it makes it easier to connect the transceivers to the bus.

Another advantage of this code is that, since there is no power transmitted for a "1", it is possible for a station to detect a "0" from another station while the first station is transmitting a "1". This simplifies collision detection.

Each transceiver 12 comprises a transmitter circuit and a receiver circuit, described below with reference to FIGS. 3 and 4. The transmitter and receiver circuits are coupled to the twisted pair 10 by means of two separate ferrite cores, referred to as the transmitter and receiver cores. Each core consists of an E-shaped part, the central limb of which is threaded through the twisted pair 10, and an I-shaped part which engages with the E-shaped part to complete the magnetic circuit. The central limb of each core carries one or more windings, as will be described.

The cores and their windings are encapsulated to protect them and are housed in a shielding enclosure connected to zero potential. The enclosure also holds the transmitter and receiver circuits.

Transmitter Circuit

Figure 3:
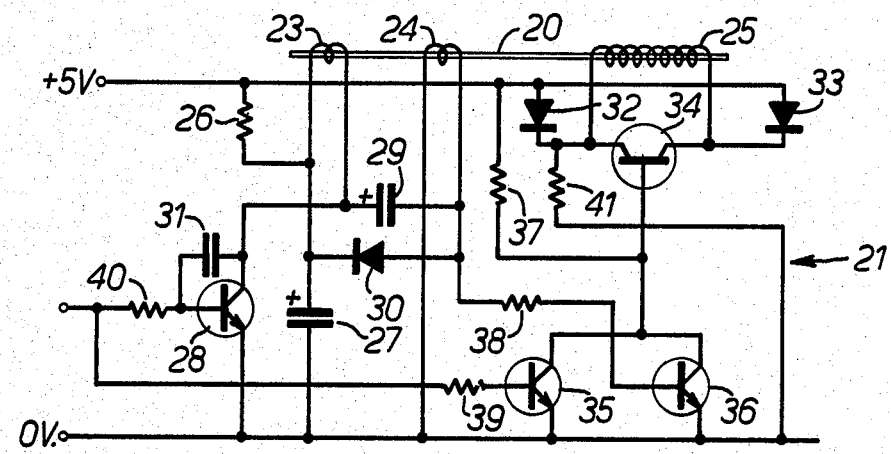
FIG. 3 shows a transmitter circuit.

Referring to FIG. 3, this shows the transmitter core 20 and the transmitter circuit 21. The transmitter core carries two transmitter windings 23,24, each of two turns, and an eight-turn clamping winding 25.

The transmitter winding 23 has one end connected by way of a resistor 26 to a +5 volt supply, and also to one terminal of a 100 microfarad capacitor 27, the other terminal of which is connected to earth. The other end of this winding 23 is connected to the collector of a switching transistor 28, the emitter of which is connected to earth. The other transmitter winding 24 has one end connected to earth and the other end connected to one terminal of a 1 microfarad capacitor 29, the other terminal of which is connected to the collector of the transistor 28. The opposite ends of the winding 23,24 are connected by a diode 30.

In the quiescent state, i.e. when no pulses are being transmitted, the transistor 28 is turned off, and hence both capacitors 27, 29 are charged up to +5 volts. In order to send a positive pulse, the transistor 28 is turned on, and this causes a current of about 5mA to flow through both windings 23,24. Since the transformer ratio is 2:1, this pulse is transformed into a pulse of about 20mA on the twisted pair 10. The current is mainly drawn from the two capacitors 27, 29. At this time, the diode 30 is reverse biassed and hence does not conduct.

At the end of the positive pulse, the transistor 28 is turned off, and a backswing now occurs which produces a negative pulse as required (see FIG. 2). During the backswing, the magnetic energy stored in the core produces an electromotive force across the transmitter windings which tends to keep the current flowing. This causes the diode 30 to become forward biassed, so that it now conducts current from the winding 23 into the capacitor 29 and from the winding 24 into the capacitor 27 recharging both capacitors. In this way, energy from the backswing of each pulse is recovered and used to re-charge the capacitors, instead of being wasted. This helps to reduce the power consumption of the transmitter.

A 150 picofarad capacitor 31 connected across the transistor 28 acts as an edge moderator to reduce high frequency components in the transmitted signal.

The two ends of the clamping winding 25 are connected by way of diodes 32,33 to the 5 volt supply line, and also to a junction field-effect transistor (JFET) 34, the gate of which is connected to a pair of transistors 35,36. In operation, when the transmitter circuit is transmitting a signal, the transistors 35,36 turn the JFET 34 off, causing the clamping winding 25 to be open-circuited. However, when the transmitter is quiescent, or if the 5 volt power supply is turned off, the JFET 34 is turned on, causing the clamping winding to be effectively short circuited. This ensures that the transmitter circuit does not draw too much power from the bus when it is not transmitting.

Typical values for the various resistors shown in FIG. 3 are as follows:

| Resistor | Value (ohms) |
| --- | --- |
| 26 | 10 |
| 37 | 22K |
| 38 | 10K |
| 39 | 1K |
| 40 | 47 |
| 41 | 100K |

Receiver Circuit

Figure 4:
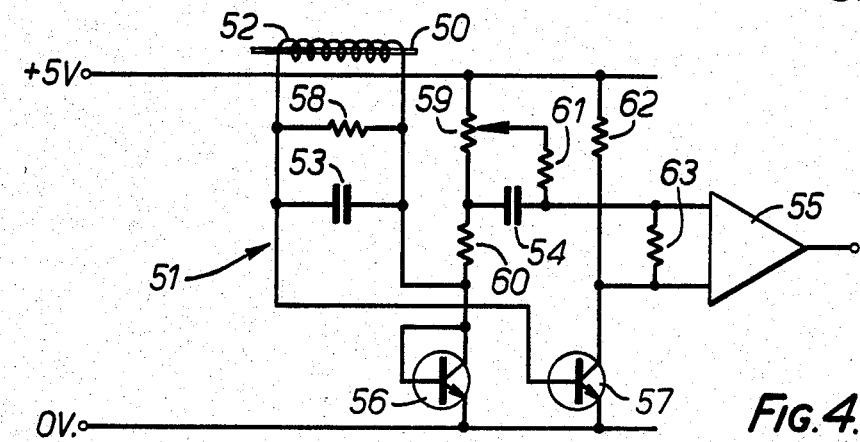
FIG. 4 shows a receiver circuit.

Referring now to FIG. 4, this shows the receiver core 50 and the receiver circuit 51. The receiver core carries a receiver winding 52 of eight turns. A 33 nanofarad capacitor 53 connected across this winding acts as a high frequency filter to reduce high frequency components in the received signal.

One end of the receiver winding 52 is connected by way of a 33 nanofarad capacitor 54 to the input of an amplifier 55, to produce the output signal for the receiver. This amplifier may for example be a National Semiconductor type LM311 operational amplifier. Biassing current for this amplifier is supplied by a current mirror arrangement consisting of two matched transistors 56,57, which also provide a first stage of amplification.

Typical values for the various resistors shown in FIG. 4 are as follows.

| Resistors | Value (ohms) |
| --- | --- |
| 58 | 5 |
| 59 | 5K |
| 60 | 1.5K |
| 61 | 220K |
| 62 | 5K |
| 63 | 10K |

Message Preamble

Whenever a station sends a message, it starts with a preamble consisting of six eight-bit bytes. The first three bytes are as follows:

| |
| --- |
| 0000 0001 |
| 1110 0011 |
| 1100 0000 |

Each of last three bytes has one of the following forms:

| |
| --- |
| 1111 1110 |
| 1111 1011 |
| 1110 1111 |
| 1011 1111 |

The first three bytes provide a synchronisation pattern which enables a receiving station to lock its internal clock on to the phase of the received signals and to determine the byte boundaries of the message.

The last three bytes of the preamble provide a "signature" for the message. It will be seen that each of these last three bytes consists of a single "0" in one of four possible locations (they can occur only in alternate bit locations). Thus, there are 4×4×4=64 different possible signatures. It is therefore possible to provide a different signature for each station, assuming there are fewer than 64 stations in the network.

The purpose of the signature is to ensure that a collision is detected even in the case where, by chance, an incoming message arrives in substantially perfect synchronism with an outgoing message. Because the signature patterns of the two messages must be different, it will be apparent that at least one of the "0" pulses of the signature of the incoming message will fall in a gap ("1") in the signature of the outgoing message. Moreover, because the "0" pulses in the signature pattern occur only at alternate bit positions, the collision can be detected even though the receiver has a dead period of one bit-time following transmission of a pulse during which it cannot detect incoming pulses.

In a modification, instead of having a unique signature for each station, each station could be arranged to generate a signature at random for each message sent by it. This might be more convenient since it would not then be necessary to assign unique signatures to the stations. There would, of course, be a possibility that two messages arriving in perfect synchronism would have identical signatures, so that a collision could not be detected at the preamble stage. However, the probability of this is very low.

It can be shown that the preamble format specified above enables collisions to be detected for any degree of overlap between incoming and outgoing messages from −19 bit-times to +46 bit-times. That is to say, if an incoming preamble is superimposed upon an outgoing preamble with any degree of misalignment within the limits stated, at least one pulse ("0") from the preamble of the incoming message will fall within a gap ("1") of the outgoing message, outside the one-bit-time dead period following an outgoing pulse. This range of detectable overlap is found to be greater than the range which can actually occur in practice, and therefore this preamble format ensures that overlapping messages will always be detected by collisions between their preambles.

We claim:

1. A data processing network comprising a plurality of data processing stations; a common bus for interconnecting the stations; and separate means for inductively separately coupling the stations to the bus, including a first magnetic core; first and second signal transmitter windings operatively coupled to the first core; a signal transmitter including first and second capacitors respectively in series with the first and second signal transmitter windings; means for charging the capacitor; first circuit paths between the first and second transmitter windings and the charging means; switching means for enabling the capacitors to be discharged through the respective transmitter windings thereby producing an output pulse on the common bus; a diode connected between the first and second transmitter windings being non-conducting whilst the capacitors are being discharged; and second circuit paths including said diode between the capacitors and the associated transmitter winding wherein when the switching means is turned off, induced electromotive force in the first and second transmitter windings causes the diode to conduct thereby completing the second circuit paths to allow the capacitors to be charged by induced currents from the transmitter.

2. A data processing network as claimed in claim 1, and including a clamping winding on the first core; a junction field effect transmitter connected across the clamping winding; and means operative when the transmitter means is quiescent to cause the junction field effect transistor to short circuit the clamping winding whereby removal of power from the common bus is reduced whilst the transmitter means is not transmitting.

3. A data processing network as claimed in claim 1, and including signal receiving means comprising; a second magnetic core inductively coupled with the common bus; and a signal reception winding inductively coupled with the second magnetic core, and connected with a signal receiver.

4. A data processing network as claimed in claim 3, in which the signal receiver includes a current mirror arrangement providing biassing current for an output amplifier for the receiver circuit and acting as a preamplification stage for the output amplifier.

* * * * *